US009032225B2

(12) United States Patent
Lake et al.

(10) Patent No.: US 9,032,225 B2
(45) Date of Patent: May 12, 2015

(54) DETERMINATION OF WAKE SIGNAL INITIATION ON SHARED WAKE PINS IN COMPUTING DEVICES

(75) Inventors: Christopher J. Lake, Folsom, CA (US); Bhushan Vaidya, Folsom, CA (US); William Knolla, Folsom, CA (US); Michael N. Derr, El Dorado Hills, CA (US); Yitschak Kapschitz, Nantes (FR); Reuven Rozic, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/523,812

(22) Filed: Jun. 14, 2012

(65) Prior Publication Data
US 2013/0339758 A1 Dec. 19, 2013

(51) Int. Cl.
*G06F 1/26* (2006.01)
(52) U.S. Cl.
CPC .......... *G06F 1/26* (2013.01); *G06F 2213/2422* (2013.01)
(58) Field of Classification Search
CPC ............................ G06F 1/26; G06F 2213/2422
USPC ........................................................ 713/300
See application file for complete search history.

(56) References Cited

U.S. PATENT DOCUMENTS

| 6,564,330 | B1* | 5/2003 | Martinez et al. | 713/322 |
| 8,335,229 | B1* | 12/2012 | Mueller et al. | 370/439 |
| 2002/0116563 | A1* | 8/2002 | Lever | 710/260 |
| 2011/0119511 | A1* | 5/2011 | Osborn et al. | 713/323 |

* cited by examiner

*Primary Examiner* — Thomas Lee
*Assistant Examiner* — Danny Chan
(74) *Attorney, Agent, or Firm* — Schwabe, Williamson & Wyatt, P.C.

(57) ABSTRACT

Embodiments of computer-implemented methods, systems, computing devices, and computer-readable media are described herein for transitioning a computing device between a first state in which the computing device uses a first amount of power and a second state in which the computing device uses a second, greater amount of power. The computing device may include a shared wake pin to which a first external device and a second external device may be operably coupled, and a communication bus to which the first external device is connected and the second external device is not. Responsive to receipt of a wake signal at the wake pin, the computing device may transition between states, send an instruction to the first external device over the communication bus, and determine whether the first or second external device initiated the wake signal based on a response at the wake pin.

30 Claims, 4 Drawing Sheets

DETERMINATION OF WAKE SIGNAL INITIATION ON SHARED WAKE PINS IN COMPUTING DEVICES

FIELD

Embodiments of the present invention relate generally to the technical field of data processing, and more particularly, to utilization of shared wake pins in computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

When a computing device is in a low power or "sleep" state, certain interfaces of the computing device may be powered down. External devices that remain powered up when the computing device is in such a state, such as network interfaces, antenna, laptop lid sensors, and so forth, may rely on these interfaces to the computing device that are now powered down. As such, the external devices may not be able to communicate a request to the computing device to wake up the computing device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
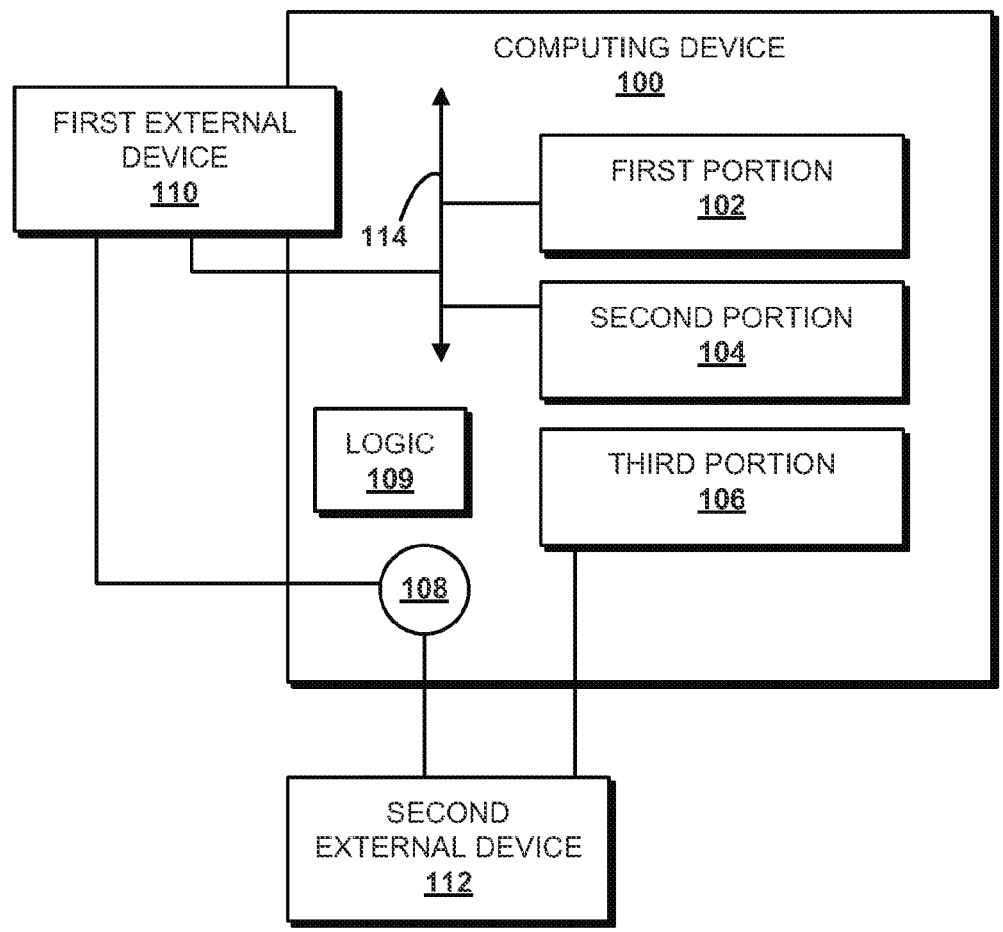
FIG. 1 schematically illustrates an example computing device with a shared wake pin, in accordance with various embodiments.

Referring now to FIG. 1, in various embodiments, a computing device 100 may include various portions that may each contain various circuitry and/or other components for performing various operations and interacting with various internal and external components. In various embodiments, computing device 100 may be configured to provide power to, or to "power up," each portion independently.

In FIG. 1, three portions are shown: first portion 102, second portion 104 and third portion 106. However, this is not meant to be limiting, and more or less portions of computing device 100 may be capable of being independently powered up. Moreover, while the three portions are shown separately, this is only meant to indicate that the portions may be independently powered. In various embodiments, portions may contain circuitry and/or other components that overlap with circuitry and/or components of other portions of computing device 100.

In various embodiments, computing device 100 may include at least one shared wake pin 108. Shared wake pin 108 may be any sort of component through which data and/or electricity may be passed, such as a conductive interface on a printed circuit board ("PCB"). In various embodiments, shared wake pin 108 may be incorporated into a processor, a chipset, a platform controller hub ("PCH"), a PCB, or any other component found on a typical computing device. In various embodiments, shared wake pin 108 may be in operable communication with logic 109 (which may be implemented as hardware and/or software in or by various components such as a processor or a PCH) configured to transition one or more portions of computing device (e.g., 102, 104, 106) from a sleep state to one or more power-consuming states.

In various embodiments, shared wake pin 108 may be operably, and in many cases, removably, connected to a first external device 110 and a second external device 112. First and second external devices 110, 112 may each be any sort of device that may be connected to a computing device such as computing device 100. More particularly, first and second external devices 110, 112 may be any device that may remain powered up when computing device 100 is in a low power state or sleep state. In various embodiments, first and second external devices 110, 112 may be devices that, in response to various events and/or stimuli, may seek to wake computing device 100 from a low power or sleep state.

Computing device 100 may consume various amounts of power when operating first external device 110 as compared to when operating second external device 112. For example, in some embodiments, such as many of the embodiments described herein, computing device 100 may consume less power when operating first external device 110 than when operating second external device 112. For example, in some embodiments, first external device 110 may be a type of device such as a network interface (e.g., Ethernet, wireless antenna) that may not require that computing device 100 fully power up in order to operate. Second external device 112 may require that computing device 100 consume more power than when operating first external device 110, e.g., full operational power. For example, second external device 112 may be any number of devices that may wake up computing device 100 to a greater extent than first external device 110, including but not limited to a sensor for detecting when a laptop computer is opened, an actuator (e.g., a button) for bringing a portable computing device such as a smart phone or tablet out of a sleep mode, a scanner, a multi-purpose unit (e.g., scanner plus printer), a microphone, radio transceivers (e.g., BlueTooth, radio frequency identification, or "RFID"), and so forth.

In other embodiments, computing device 100 may consume more power when operating first external device 110 than second external device 112. For example, even if first external device 110 is a network interface, it may request that computing device 100 fully power up, e.g., to perform computationally-intensive operations. As another example, first external device 110 could be a type of device that in general requires computing device 100 to consume more power than when operating second external device 112. In some embodiments, computing device 100 may consume the same or a similar amount of power when operating first external device 110 as when operating second external device 112. In some embodiments, the amount of power consumed by computing device 100 when operating first and second external devices 110 and 112 may fluctuate, so that at one moment, first external device 110 may require more power, and at another moment, second external device 112 may require more power.

In various embodiments, computing device 100 may include a communication bus 114. In various embodiments, such as the one shown in FIG. 1 and in many of the embodiments describe herein, first external device 110 may be operably connected to communication bus 114, and second external device 112 may not be operably connected to communication bus 114. However, this is not required. In other embodiments, second external device 112 may be operably connected to communication bus 114 and first external device 110 may not.

In various embodiments, communication bus 114 may be a relatively low power, low bandwidth and/or low speed bus, such as a bus that complies with the Inter-Integrated Circuit ("I²C") standard. In various embodiments, communication bus 114 may be a system management bus ("SMBus"), which may be found in various products from the Intel® Corporation of Santa Clara, Calif. In other embodiments, communication bus 114 may be other types of buses with relatively higher power requirements, speeds and/or bandwidths. For example, in various embodiments, communication bus 114 may be a peripheral controller interface ("PCI") or PCI Express ("PCIe") bus.

One or more portions of computing device 100 may be operably coupled to communication bus 114. For instance, in FIG. 1, first portion 102 may be operably coupled to communication bus 114. In some embodiments, first portion 102 may be a subset of all circuitry and/or other components of computing device 100 that are required to operate communication bus 114. Second portion 104 is also shown connected to communication bus 114 (though this is not required). In some embodiments, second portion 104 may be a subset of all circuitry and/or other components of computing device 100 that are required to operate first external device 110 and communication bus 114. In some such embodiments, first portion 102 may be a subset of second portion 104, and computing device 100 may consume more power to operate second portion 104 than it would to operate first portion 102 alone. In other embodiments, first portion 102 and second portion 104 may be coextensive.

In various embodiments, including many embodiments described herein, second external device 112 may not be operably connected to communication bus 114. And as noted above, in various embodiments, including many embodiments described herein, second external device 112 may require more computing resources (e.g., power, bandwidth, processing power, etc.) than first external device 110 (though this is not required). For instance, in FIG. 1, second external device 112 is operably connected to third portion 106. In various embodiments, third portion 106 may be a superset of first portion 102 and/or second portion 104. For instance, third portion 106 may include most or all circuitry and/or other components of computing device 100. In various embodiments, third portion 106 may require more power to operate than first portion 102 and/or second portion 104. For example, computing device 100 may be considered "fully operational" when third portion 106 is powered up.

Figure 2:
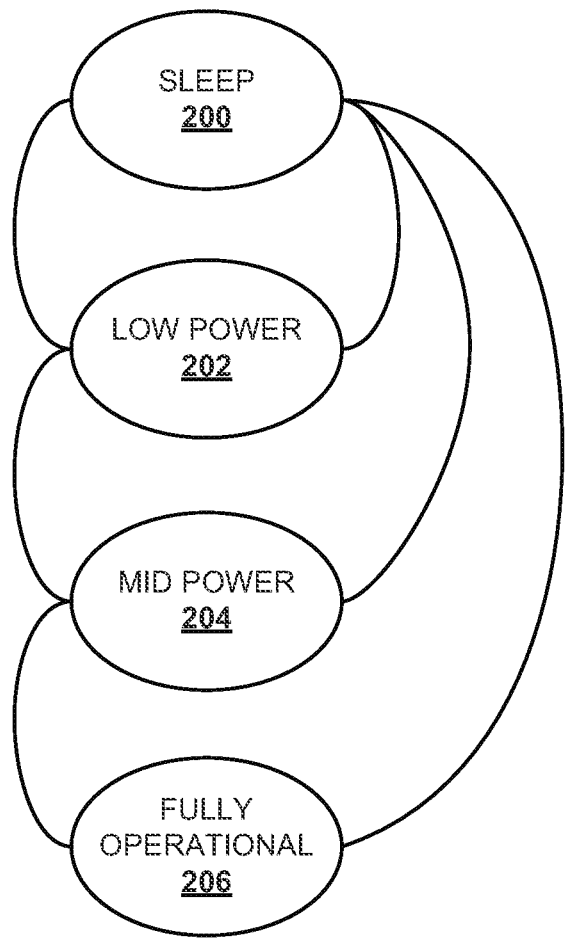
FIG. 2 schematically illustrates an example of various power consumption states of a computing device with a shared wake pin, in accordance with various embodiments.

In various embodiments, computing device 100 may be configured to transition between various states in which it consumes various amounts of power. For example, as shown in FIG. 2, computing device 100 may initially be in a sleep state 200 in which it consumes little or no power. Computing device 100 may be configured to transition from sleep state 200 to a non-sleep, low power state 202 in which first portion 102 (e.g., enough circuitry to operate communication bus 114) is powered up, e.g., in response to various events and/or stimuli that will be described below.

Computing device 100 may further be configured to transition, either from the sleep state 200 or low power state 202, to a "mid power" state 204 in which computing device consumes more power than when in sleep state 200 or low power state 202. For example, computing device 100 may power up second portion 104 in response to various events and/or stimuli that will be discussed below.

Computing device 100 may also be configured to transition from sleep state 200, low power state 202 or mid power state 204 to a "fully operational" state 206. "Fully operational" does not necessarily mean that computing device 100 is consuming as much power as it is capable. It simply means that relatively few (and perhaps no) portions of computing device 100 are powered down. For example, computing device 100 may power up third portion 106 to be in fully operational state 206. In response to various events, e.g., a process completing execution or being shut down, or passage of a predetermined time interval, computing device 100 may transition from any of states 202-206 back to the sleep state 200. The states shown in FIG. 2 are not meant to be limiting, and a computing device may have more or less power consumption states.

Computing device 100 may transition from sleep state 200 to any of the other described states in response to being "woken up." In various embodiments, computing device may be "woken up" in response to an external device. For example, a wake signal may be received at shared wake pin 108 from first external device 110 or second external device 112. However, without more information, computing device 100 may not be able to determine which external device is driving shared wake pin 108.

Accordingly, in various embodiments, computing device 100 may be configured to, responsive to receipt of the wake signal at shared wake pin 108, send an instruction to first external device 110 over the communication bus 114. In various embodiments, computing device 100 may determine whether first external device 110 or second external device 112 initiated the wake signal based on a response at shared wake pin 108.

In various embodiments, the instruction may be to cease transmission of a wake signal. In various embodiments, computing device 100 may be configured to determine whether first external device 110 or second external device 112 initiated the wake signal based on whether the wake signal at shared wake pin 108 ceases. If the wake signal ceases, it may be presumed that first external device 110 was the external device that was driving shared wake pin 108 (because second external device 112 is not operably connected to communication bus 114). In such case, appropriate actions related to operation of or interaction with first external device 110 may be taken.

However, if the wake signal does not cease, then it may be presumed that first external device 110 was not the device driving shared wake pin 108. Assuming second external device 112 is the only other external device operably connected to shared wake pin 108, it may be presumed that second external device 112 is the device driving shared wake pin 108, and appropriate actions man be taken.

In embodiments where more than two external devices are operably connected to shared wake pin 108, the instruction to cease driving the pin may be sent to more than two external devices connected to communication bus 114. If the wake signal ceases, then a total population of external devices that could be attempting to wake up computing device 100 may be narrowed to those operably connected to communication bus 114. If the wake signal does not cease, then the total population of external devices that could be attempting to wake up computing device 100 may be narrowed to those not operably connected to communication bus 114. Computing device 100 may then take various other actions to further narrow down the population of candidate external devices and eventually identify the external device that is driving shared wake pin 108.

Computing device 100 may power up various portions, transition between various power consumption states and perform various actions responsive to receipt of a wake signal at shared wake pin 108, to determinations of which external device was driving shared wake pin 108, and/or to instructions from external devices. In some embodiments, computing device 100 may power up first portion 102 and transition from sleep state 200 to low power state 202 responsive to various events and/or stimuli. For example, in some embodiments, computing device 100 may power up first portion 102 responsive to receipt of the wake signal at shared wake pin 108. This may enable computing device 100 to send out the instruction over communication bus 114.

In various embodiments, computing device 100 may power up second portion 104 and transition from low power state 202 or sleep state 200 to mid power state 204 responsive to various events and/or stimuli. For example, in some embodiments, computing device 100 may power up second portion 104 responsive to a determination that first external device 110 initiated the wake signal. For example, if first external device 110 ceases driving shared wake pin 108 in response to the instruction over communication bus 114, then computing device 100 may power up second portion 104 so that first external device 110 may be fully operated.

In various embodiments, computing device 100 may power up third portion 106 and transition from low power state 202, sleep state 200 and/or mid power state 204 to fully operational state 206 responsive to various events and/or stimuli. For example, in some embodiments, computing device 100 may power up third portion 106 responsive to a determination that second external device 112 initiated the wake signal. In some embodiments, computing device 100 may power up third portion 106 responsive to a request from first external device 110 (e.g., after first external device stops driving share wake pin 108) or second external device 112 to power up third portion 106.

Figure 3:
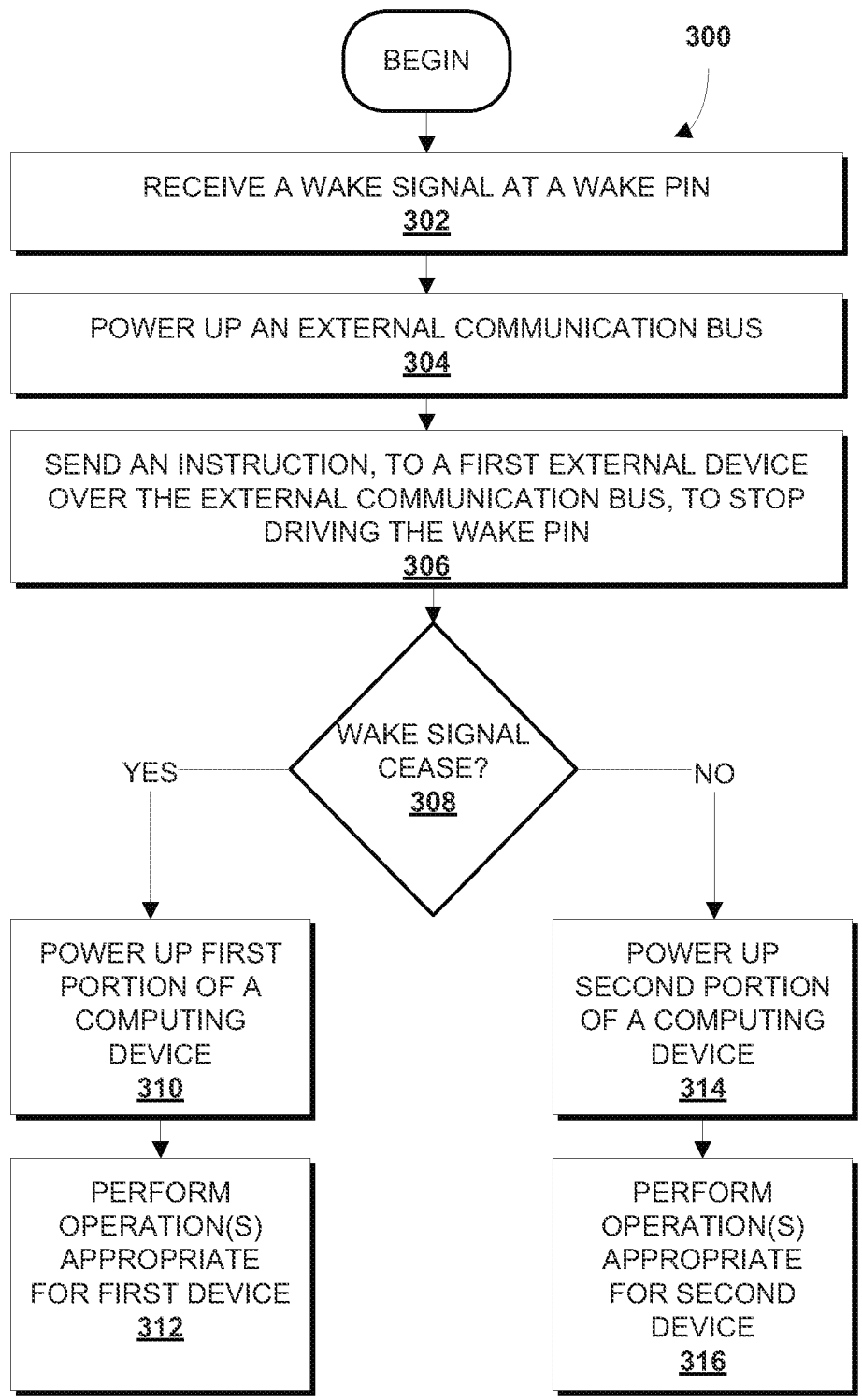
FIG. 3 schematically illustrates an example method that may be implemented by a computing device with a shared pin, in accordance with various embodiments.

An example method 300 that may be implemented to support low power consumption in a computing device (e.g., 100) while still allowing options for waking the computing device is shown in FIG. 3. At block 302, a wake signal may be received at a shared wake pin (e.g., 108) to which first and second external devices (e.g., 110, 112) may be operably connected. Logic (e.g., 109 in FIG. 1) associated with the computing device may not be able to determine from the wake signal alone whether a first or second external device is driving the shared wake pin.

Accordingly, the logic may proceed to block 304, in which it powers up a communication bus (e.g., 114). In some embodiments, the logic may power up an entire computing device. In other embodiments, the logic may power up less than the entire computing device, such as a portion of the computing device (e.g., first portion 102, second portion 104, third portion 106), or just the communication bus. In any case, at block 306, an instruction may be sent, e.g., by the logic, over the communication bus to the external device that is operably connected to the communication bus. As noted above, the first external device may be connected to the communication bus, and therefore may receive the instruction, while the second external device may not be connected to the communication bus, and therefore may not receive the instruction. In various embodiments, the instruction may be for the external device to stop driving the shared wake pin.

At block 308, it may be determined, e.g., by the logic, whether the wake signal at the shared wake pin ceased. If the answer is yes, then it may be assumed that the first external device connected to the external bus was the device that originally provided the wake signal at the wake pin. In such case, at block 310, a portion of a computing device (e.g., all or a portion of a chipset or PCH) utilized by the first external device operably connected to the communication bus may be powered up. At block 312, the logic and/or other components of the computing device may perform various operations appropriate for situations in which the first external device wakes up the computing device. For instance, if the external device is a network interface, then it may be appropriate for the computing device to wake up and respond to whatever incoming communication caused the network interface to drive the wake pin in the first place.

If the answer at block 308 is no, then it may be assumed that the second external device that is not connected to the external bus was the device that originally provided the wake signal at the wake pin. In such case, at block 314, one or more portions of the computing device utilized by the second external device that is not operably connected to the external bus may be powered up. At block 316, the logic and/or other components of the computing device may perform various operations appropriate for situations in which the second external device wakes up the computing device. For instance, the second external device may be a multi-purpose unit that includes, e.g., a printer and scanner. The multi-purpose unit may be connected to a computing device that is powered down. When a user desires to scan an image to file, the user may insert the image onto the scanner and actuate the scanner (e.g., using a button or touch screen display). The multi-purpose unit may then drive the wake pin in order to wake appropriate portions of the computing device, so that the scanned image may be stored.

Figure 4:
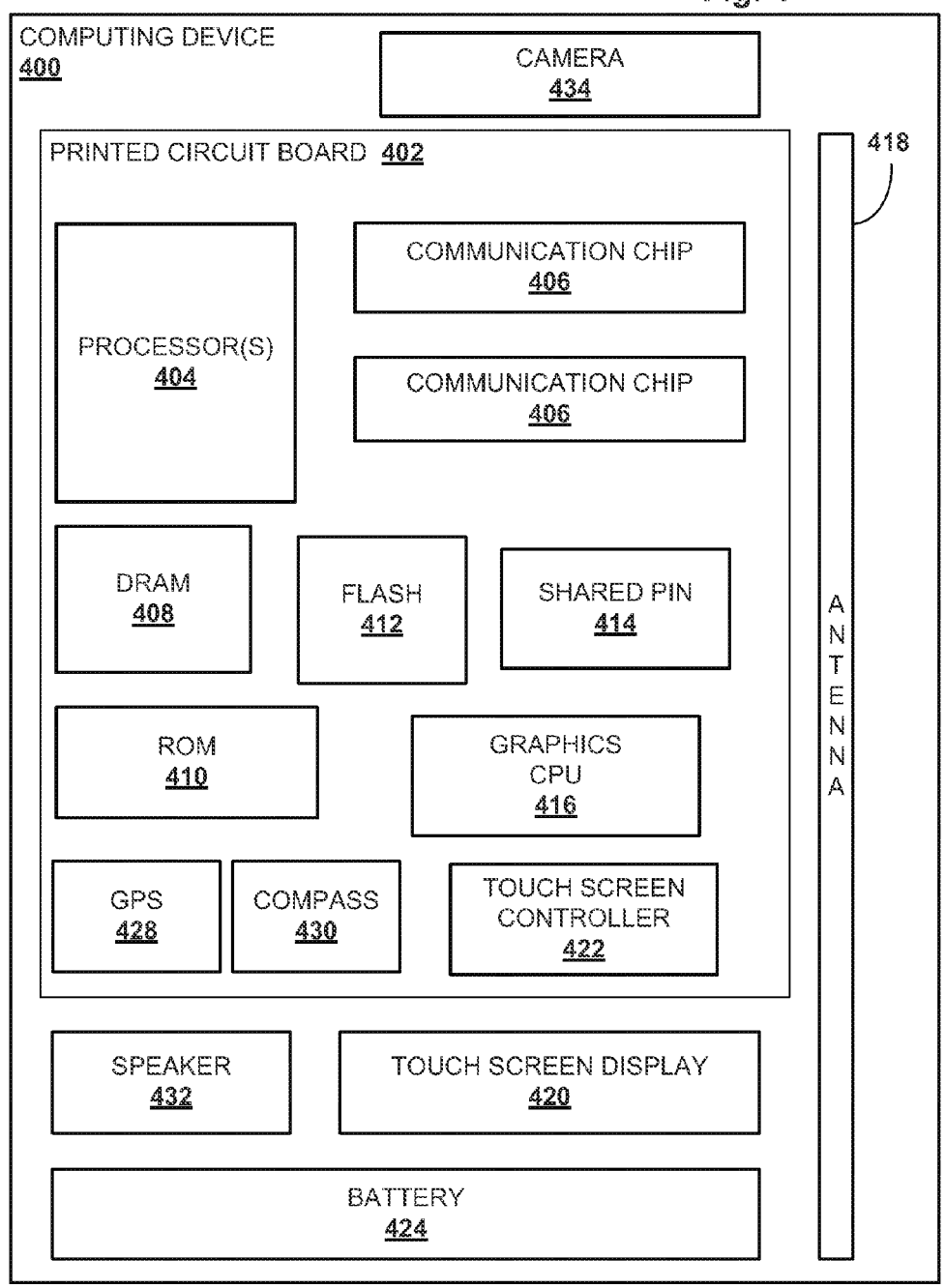
FIG. 4 schematically depicts an example computing device on which disclosed methods and computer-readable media may be implemented, in accordance with various embodiments.

FIG. 4 illustrates an example computing device 400, in accordance with various embodiments. Computing device 400 may include a number of components, a processor 404 and at least one communication chip 406. In various embodiments, the processor 404 may be a processor core. In various embodiments, the at least one communication chip 406 may also be physically and electrically coupled to the processor 404. In further implementations, the communication chip 406 may be part of the processor 404. In various embodiments, computing device 400 may include PCB 402. For these embodiments, processor 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, volatile memory (e.g., dynamic random access memory 408, also referred to as "DRAM"), non-volatile memory (e.g., read only memory 410, also referred to as "ROM"), flash memory 412, a shared wake pin 414, an input/output controller (not shown), a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system ("GPS") device 428, a compass 430, an accelerometer (not shown), a gyroscope (not shown), a speaker 432, a camera 434, and a mass storage device (such as hard disk drive, a solid state drive, compact disk ("CD"), digital versatile disk ("DVD")) (not shown), and so forth. In various embodiments, the processor 404 may be integrated on the same die with other components to form a System on Chip ("SoC"). In various embodiments, various components may be bundled together to form a package (e.g., a chipset, PCH, motherboard) that may be installed into a computing device such as computing device 100 or computing device 400. In various embodiments, the package may include one or more of the processor 404, memory (e.g., DRAM 408, ROM 410, flash memory 412), a shared wake pin, a communication bus (e.g., 114) and/or a logic (e.g., 109).

In various embodiments, volatile memory (e.g., DRAM 408), non-volatile memory (e.g., ROM 410), flash memory 412, and the mass storage device may include programming instructions configured to enable computing device 400, in response to execution by processor(s) 404, to practice all or selected aspects of method 300. For example, one or more of the memory components such as volatile memory (e.g., DRAM 408), non-volatile memory (e.g., ROM 410), flash memory 412, and the mass storage device may include temporal and/or persistent copies of instructions configured to enable computing device 400 to practice disclosed techniques, such as all or selected aspects of method 300.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and cellular radio interfaces as examples. However, the communication chip 406 may implement any of a number of wireless standards or protocols, including but not limited to WiMAX, IEEE 402.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 400 may be any other electronic device that processes data.

Example embodiments of apparatus, packages, computer-implemented methods, systems, devices, and computer-readable media (transitory and non-transitory) are described below for transitioning a computing device between a first state in which the computing device uses a first amount of power and a second state in which the computing device uses a second amount of power that is greater than the first amount of power. In various embodiments, the computing device may include a shared wake pin to which a first external device and a second external device may be operably coupled.

In various embodiments, the computing device may include a communication bus to which the first external device is connected and the second external device is not. In various embodiments, responsive to receipt of a wake signal at the wake pin, the computing device may be configured to transition from the first state to the second state, send an instruction to the first external device over the communication bus, and determine whether the first or second external device initiated the wake signal based on a response at the wake pin. In various embodiments, the computing device may be configured to transition from the first state to a third state in which the computing device uses a third amount of power that is greater than the first or second amounts of power, responsive to a determination that the second external device initiated the wake signal.

In various embodiments, the computing device may be configured to power up a first portion of the computing device responsive to a determination that the first external device initiated the wake signal. In various embodiments, the computing device may be configured to power up a second portion of the computing device responsive to a determination that the second external device initiated the wake signal.

In various embodiments, the second portion of the computing device may include a peripheral component interface bus. In various embodiments, the communication bus may be an inter-integrated circuit bus. In various embodiments, the instruction may include an instruction to cease transmission of a wake signal. In various embodiments, the computing device may be configured to determine whether the first or second external device initiated the wake signal based on whether the wake signal at the wake pin ceases.

In various embodiments, the first or second external device may be a network communication interface such as an antenna. In various embodiments, the computing device may include a touch screen display. In various embodiments, the computing device may be configured to power up the communication bus responsive to the wake signal, without powering up other portions of the computing device.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system, comprising:
    a wake pin coupled with first and second external devices, wherein the system is configured to transition between a first power state in which the system uses a first amount of power and a second power state in which the system uses a second amount of power that is greater than the first amount of power;
    a communication bus to which the first external device is connected and the second external device is not, wherein the communication bus is separate from the wake pin; and
    logic to:
        transition, responsive to receipt of a wake signal at the wake pin, the system from the first power state to the second power state;
        facilitate, based on the receipt of the wake signal at the wake pin, transmission of an instruction to the first external device over the communication bus; and
        determine whether the first or second external device initiated the wake signal based on whether the wake signal changes in response to the instruction.

2. The system of claim 1, wherein the system is further configured to power up a first portion of the system responsive to a determination that the first external device initiated the wake signal, and to power up a second portion of the system responsive to a determination that the second external device initiated the wake signal.

3. The system of claim 2, wherein the second portion of the system includes a peripheral component interface bus.

4. The system of claim 1, wherein the communication bus is an inter-integrated circuit bus.

5. The system of claim 1, wherein the instruction includes an instruction to cease transmission of a wake signal, and wherein the logic is further to determine whether the first or second external device initiated the wake signal based on whether the wake signal at the wake pin ceases.

6. The system of claim 1, wherein the first external device is a network communication interface.

7. The system of claim 1, wherein the first or second external device is an antenna.

8. The system of claim 1, further comprising a touch screen display.

9. The system of claim 1, wherein the logic is further to transition the system from the first state to a third state in which the system uses a third amount of power that is greater than the first or second amounts of power responsive to a determination that the second external device initiated the wake signal.

10. The system of claim 1, wherein the logic is further to power up the communication bus responsive to the wake signal, without powering up other portions of the system.

11. A computer-implemented method, comprising:
    receiving, at a shared wake pin of a computing device, wherein the shared wake pin is operably connected to first and second external devices, a wake signal;
    responsive to receipt of the wake signal at the shared wake pin, facilitating, by logic associated with the computing device, transition of the computing device from a first power state in which the computing device consumes a first amount of power to a second power state in which the computing device consumes a second amount of power that is greater than the first amount of power, wherein the second amount of power is less than a third amount of power consumed by the computing device when in a third state;
    responsive to receipt of the wake signal at the shared wake pin, sending, by the logic associated with the computing device, an instruction to the first external device over a communication bus to which the first external device is connected and the second external device is not, wherein the shared communication bus is different than the shared wake pin; and
    determining, by the logic associated with the computing device, whether the first or second external device initiated the wake signal based on whether the wake signal changes in response to the instruction.

12. The computer-implemented method of claim 11, further comprising:
    powering up, by the logic associated with the computing device, a first portion of the computing device responsive to the wake signal; and
    powering up, by the logic associated with the computing device, a second portion of the computing device responsive to a determination that the second external device initiated the wake signal.

13. The computer-implemented method of claim 12, wherein the first portion includes the communication bus, and the second portion includes a peripheral controller interface bus.

14. The computer-implemented method of claim 11, wherein the communication bus is an inter-integrated circuit bus.

15. The computer-implemented method of claim 11, wherein the instruction comprises an instruction to cease transmission of a wake signal, and the method further comprises determining, by the logic associated with the computing device, whether the first or second external device initiated the wake signal based on whether the wake signal at the shared wake pin ceases.

16. The computer-implemented method of claim 11, wherein the first external device is a network communication interface.

17. The computer-implemented method of claim 11, wherein the first or second external device is an antenna.

18. The computer-implemented method of claim 11, further comprising facilitating, by the logic associated with the computing device, transition from the first state to a third state in which the system uses a third amount of power that is greater than the first or second amounts of power, responsive to a determination that the second external device initiated the wake signal.

19. A package, comprising:
   one or more processors;
   a memory operably coupled with the one or more processors;
   a shared wake pin operably coupled with first and second external devices;
   an inter-integrated circuit bus to which the first external device is operably coupled and the second external device is not, wherein the inter-integrated circuit bus is different than the shared wake pin; and
   a logic to be operated by the one or more processors, the logic to transition a computing device in which the package is installed between a first power state in which the computing device uses a first amount of power and a second power state in which the computing device uses a second amount of power that is greater than the first amount of power;
   wherein responsive to receipt of a wake signal at the shared wake pin, the logic is further to:
      transition the computing device from the first power state to the second power state;
      send an instruction to the first external device over the inter-integrated circuit bus; and
      determine whether the first or second external device initiated the wake signal based on whether the wake signal changes in response to the instruction.

20. The package of claim 19, wherein the logic is further to power up a first portion of the computing device responsive to a determination that the first external device initiated the wake signal, and to power up a second portion of the computing device responsive to a determination that the second external device initiated the wake signal.

21. The package of claim 20, wherein the second portion of the computing device includes a peripheral component interface bus.

22. The package of claim 19, wherein the instruction comprises an instruction to cease transmission of the wake signal, and wherein the logic is further configured to determine whether the first or second external device initiated the wake signal based on whether the wake signal at the wake pin ceases.

23. The package of claim 19, wherein the first external device is a network communication interface.

24. The package of claim 19, wherein the first or second external device is an antenna.

25. The package of claim 19, wherein the package is further configured to transition from the first state to a third state in which the computing device uses a third amount of power that is greater than the first or second amounts of power, responsive to a determination that the second external device initiated the wake signal.

26. At least one non-transitory computer-readable medium having computer-readable code embodied therein, the computer-readable code to enable a computing device, in response to execution of the code, to:
   receive, at a shared wake pin of the computing device, wherein the shared wake pin is operably connected to first and second external devices, a wake signal;
   responsive to receipt of the wake signal at the shared wake pin, facilitate transition of the computing device from a first power state in which the computing device consumes a first amount of power to a second power state in which the computing device consumes a second amount of power that is greater than the first amount of power, wherein the second amount of power is less than a third amount of power consumed by the computing device when in a fully operational third state;
   responsive to receipt of the wake signal at the shared wake pin, send an instruction to the first external device over a communication bus to which the first external device is connected and the second external device is not, wherein the shared communication bus is different than the shared wake pin; and
   determine whether the first or second external device initiated the wake signal based on whether the wake signal changes in response to the instruction.

27. The at least one non-transitory computer-readable medium of claim 26, wherein the code, in response to execution by the computing device, further enables the computing device to:
   power up a first portion of the computing device responsive to the wake signal;
   power up a second portion of the computing device responsive to a determination that the first external device initiated the wake signal; and
   power up a third portion of the computing device responsive to a determination that the second external device initiated the wake signal.

28. The at least one non-transitory computer-readable medium of claim 27, wherein the first portion includes the communication bus, and the third portion includes a peripheral controller interface bus.

29. The at least one non-transitory computer-readable medium of claim 26, wherein the communication bus is an inter-integrated circuit bus.

30. The at least one non-transitory computer-readable medium of claim 26, wherein the instruction comprises an instruction to cease transmission of a wake signal, and wherein the code, in response to execution by the computing device, further enables the computing device to determine whether the first or second external device initiated the wake signal based on whether the wake signal at the shared wake pin ceases.

* * * * *